United States Patent
Matsu et al.

(10) Patent No.: US 8,205,908 B2
(45) Date of Patent: Jun. 26, 2012

(54) INFLATABLE AIRBAG ASSEMBLY HAVING A COSMETIC COVER WITH A FLEXIBLE MOUNTING BRACKET

(75) Inventors: Richard L. Matsu, Plymouth, MI (US); Matthew D. Sneary, Lake Orion, MI (US)

(73) Assignee: Autoliv ASP, Inc., Ogden, UT (US)

( * ) Notice: Subject to any disclaimer, the term of this patent is extended or adjusted under 35 U.S.C. 154(b) by 142 days.

(21) Appl. No.: 12/797,267

(22) Filed: Jun. 9, 2010

(65) Prior Publication Data

US 2011/0304126 A1 Dec. 15, 2011

(51) Int. Cl.
*B60R 21/20* (2011.01)
*B60R 21/203* (2006.01)

(52) U.S. Cl. .................... 280/728.2; 280/731

(58) Field of Classification Search ............... 280/728.2, 280/728.3, 731
See application file for complete search history.

(56) References Cited

U.S. PATENT DOCUMENTS

| | | | |
|---|---|---|---|
| 5,508,481 A | 4/1996 | Williams et al. | |
| 5,508,482 A | 4/1996 | Martin et al. | |
| 5,584,501 A | 12/1996 | Walters | |
| 6,082,758 A | 7/2000 | Schenck et al. | |
| 6,125,716 A | 10/2000 | Hosoi et al. | |
| 6,139,051 A | 10/2000 | Fujita | |
| 6,196,573 B1 | 3/2001 | Worrell et al. | |
| 6,491,319 B2 | 12/2002 | Bonn | |
| 6,508,485 B2 | 1/2003 | Kikuta et al. | |
| 6,688,637 B2 | 2/2004 | Igawa et al. | |
| 6,719,324 B2 | 4/2004 | Albers et al. | |
| 6,722,227 B2 | 4/2004 | Rabagliano et al. | |
| 6,802,531 B2 | 10/2004 | Bohn et al. | |
| 6,881,911 B2 | 4/2005 | Sugimoto | |
| 7,278,509 B2 | 10/2007 | Schroder et al. | |
| 7,547,042 B2 | 6/2009 | Chapelain et al. | |
| 7,823,908 B2 | 11/2010 | Matsu et al. | |
| 7,909,361 B2* | 3/2011 | Oblizajek et al. | 280/731 |
| 7,922,194 B2* | 4/2011 | Andersson et al. | 280/731 |
| 2006/0175816 A1 | 8/2006 | Spencer et al. | |

(Continued)

FOREIGN PATENT DOCUMENTS

WO    WO 2009/046162    4/2009

OTHER PUBLICATIONS

Notification of Transmittal of the International Search Report and the Written Opinion of the International Searching Authority issued Dec. 3, 2008 in International Application No. PCT/US2008/078533.

(Continued)

*Primary Examiner* — Joseph Rocca
(74) *Attorney, Agent, or Firm* — Sally J. Brown; Stole Rives LLP.

(57) ABSTRACT

Inflatable airbag assemblies can be mounted on a driver's side of a vehicle within a steering wheel. A gap is formed between the airbag assembly cover and the steering wheel. Maintaining a consistent width of the gap can be accomplished with an airbag assembly that is bolted to the steering wheel by minimizing the number of components used to attach the airbag assembly to the steering wheel. A flexible airbag housing mounting bracket can be used to allow the housing and cover to be positioned and oriented within the steering wheel so that the gap between the airbag cover and the steering wheel is maintained.

26 Claims, 15 Drawing Sheets

U.S. PATENT DOCUMENTS

| | | |
|---|---|---|
| 2006/0202444 A1 | 9/2006 | Rudduck et al. |
| 2007/0278772 A1 | 12/2007 | Burghardt et al. |
| 2009/0085334 A1 | 4/2009 | Matsu et al. |
| 2009/0091107 A1 | 4/2009 | Shimazaki et al. |

OTHER PUBLICATIONS

Office Action issued Oct. 5, 2009 in co-pending U.S. Appl. No. 11/866,201.

Amendment and Response to Office Action filed Apr. 5, 2010 in co-pending U.S. Appl. No. 11/866,201.

Office Action issued May 10, 2010 in co-pending U.S. Appl. No. 11/866,201.

Amendment and Response to Office Action filed Jul. 12, 2010 in co-pending U.S. Appl. No. 11/866,201.

Notice of Allowance issued Jul. 26, 2010 in co-pending U.S. Appl. No. 11/866,201.

\* cited by examiner

US 8,205,908 B2

INFLATABLE AIRBAG ASSEMBLY HAVING A COSMETIC COVER WITH A FLEXIBLE MOUNTING BRACKET

TECHNICAL FIELD

The present disclosure relates generally to the field of automotive safety systems. More specifically, the present disclosure relates to inflatable airbag assemblies having a cosmetic cover.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to a front passenger airbag, a driver's airbag, or any other airbag type.

Front airbags are typically installed in the steering wheel and instrument panel of a vehicle. During installation, the airbags are rolled, folded, or both, and are retained in this packaged configuration behind a cover. During a collision event, vehicle sensors trigger the activation of an inflator, which rapidly fills the airbag with inflation gas. Thus the airbag rapidly changes confirmations from the packaged configuration to a deployed and inflated configuration.

Figure 1A:
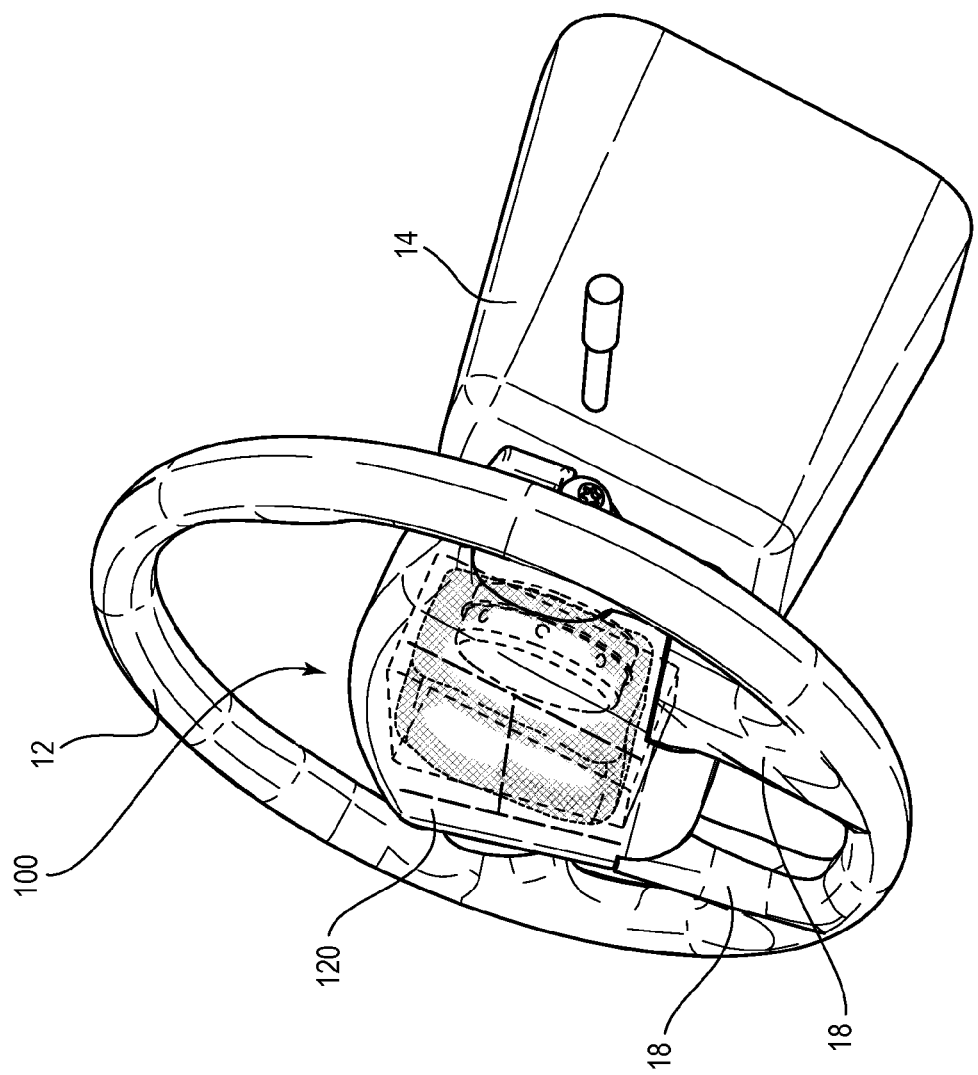
FIG. 1A is a perspective view of an airbag assembly, wherein the airbag assembly is located at a steering wheel of a vehicle and the airbag assembly is in a packaged, undeployed configuration.
Figure 1B:
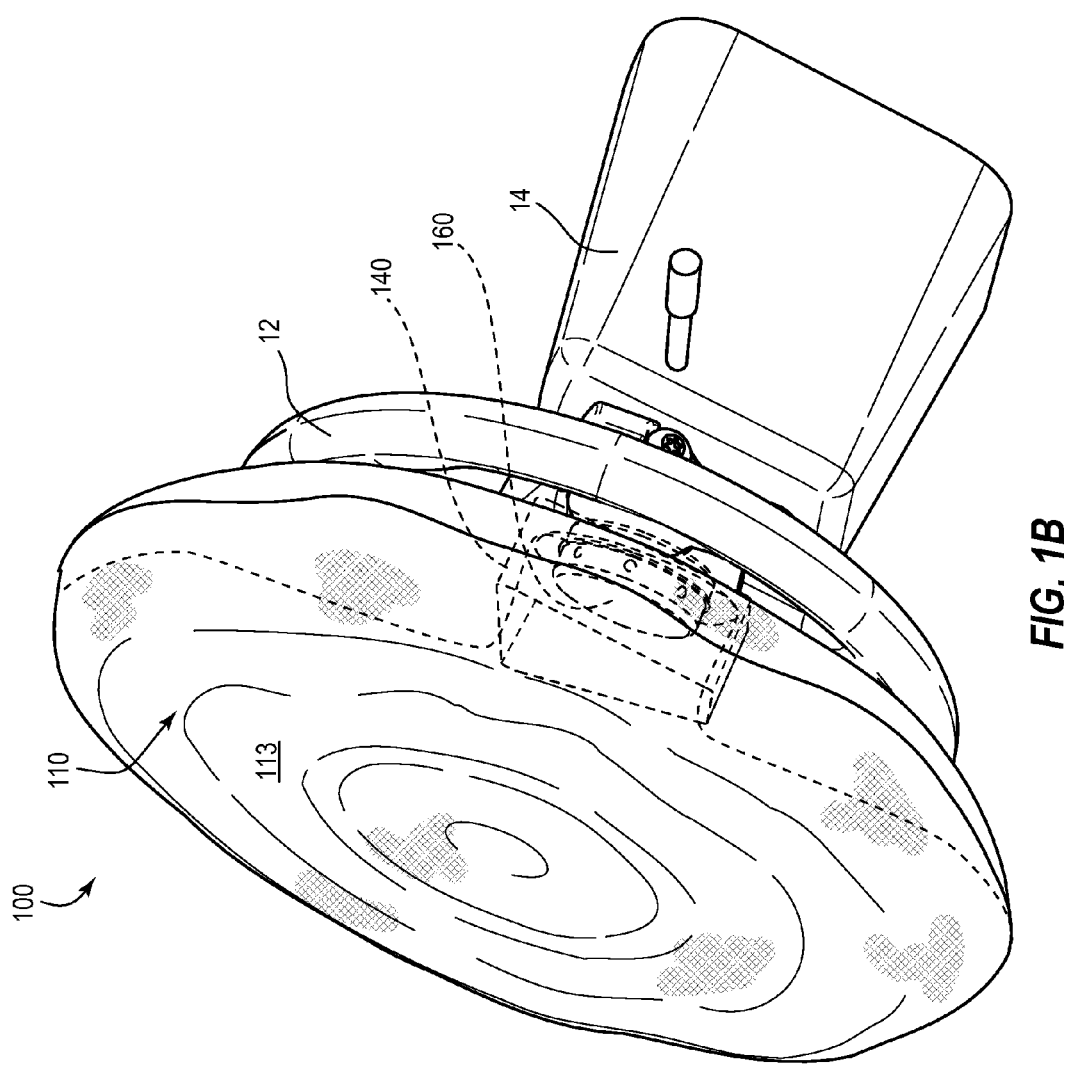
FIG. 1B is a perspective view of the airbag assembly of FIG. 1A after the inflatable airbag of the airbag assembly has been deployed.

FIGS. 1A-1B depict airbag assembly 100, wherein FIG. 1A depicts airbag assembly 100 in a packaged configuration, and FIG. 1B depicts the assembly in a deployed and inflated configuration. FIGS. 1A-1B depict a steering wheel 12 and a steering column 14 of a vehicle. Steering wheel 12 has hand grips 18, and a cover 120, behind which a remainder of the airbag assembly 100 is located. Airbag assembly 100 may comprise an inflatable airbag 110, an airbag housing 140, and an inflator 160. Airbag 110 comprises a front face 113, which in the deployed and inflated configuration is directed toward an occupant and may partially define a cabin side of the airbag.

As will be appreciated by those skilled in the art, a variety of types and configurations of airbag cushion membranes can be utilized without departing from the scope and spirit of the present disclosure. For example, the size, shape, and proportions of the cushion membrane may vary according to its use in different vehicles or different locations within a vehicle such that the cushion may comprise an inflatable cushion; a rear passenger side airbag; a driver's airbag; and/or a front passenger airbag. Also, the cushion membrane may comprise one or more pieces of any material well known in the art, such as a woven nylon fabric. Additionally, the airbag cushion may be manufactured using a variety of techniques such as one piece weaving, "cut and sew", or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Figure 2:
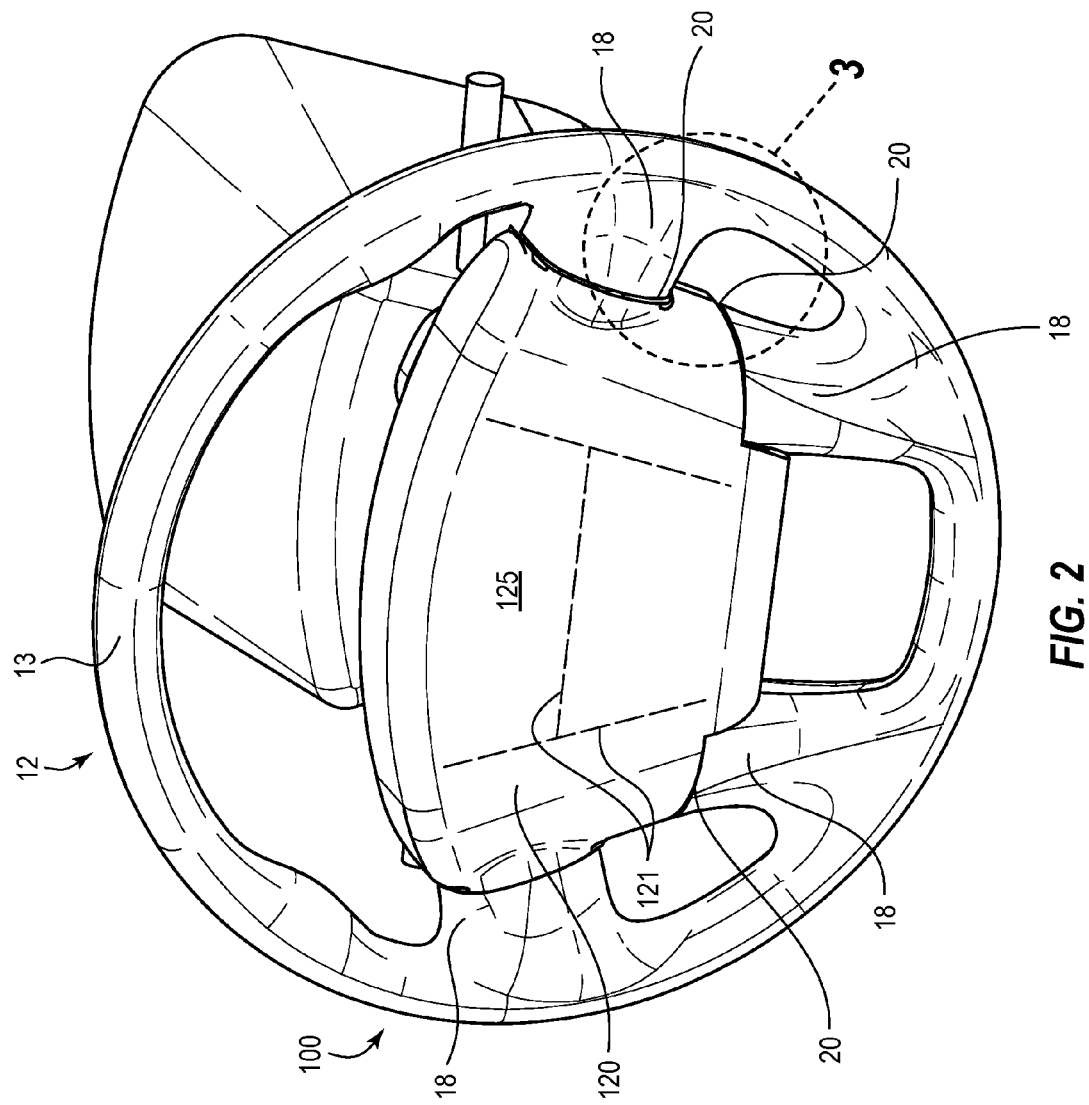
FIG. 2 is a front perspective view of the airbag assembly of FIG. 1A

FIG. 2 depicts a front elevation view of a portion of airbag assembly 100. Steering wheel 12 has a circular rim 13 and hand grips 18. Circular rim 13 and hand grips 18 may comprise polyurethane that is molded around an armature. Hand grips 18 comprise extensions or spokes that are built on the armature. Steering wheel rim 13 and hand grips 18 may comprise a foam material, such as polyurethane. Cover 120 is coupled to steering wheel 12, such that a gap 20 is formed between hand grips 18 and cover 120. Cover 120 may comprise a tear seam 121, which may be visible or hidden. Outside surface 125 of cover 120 may comprise a cosmetically finished surface. Inflatable airbag assembly 100 is configured such that variance in a width of gaps 20 is minimized while also allowing the inflatable airbag assembly to be a "bolt in" assembly.

Figure 3:
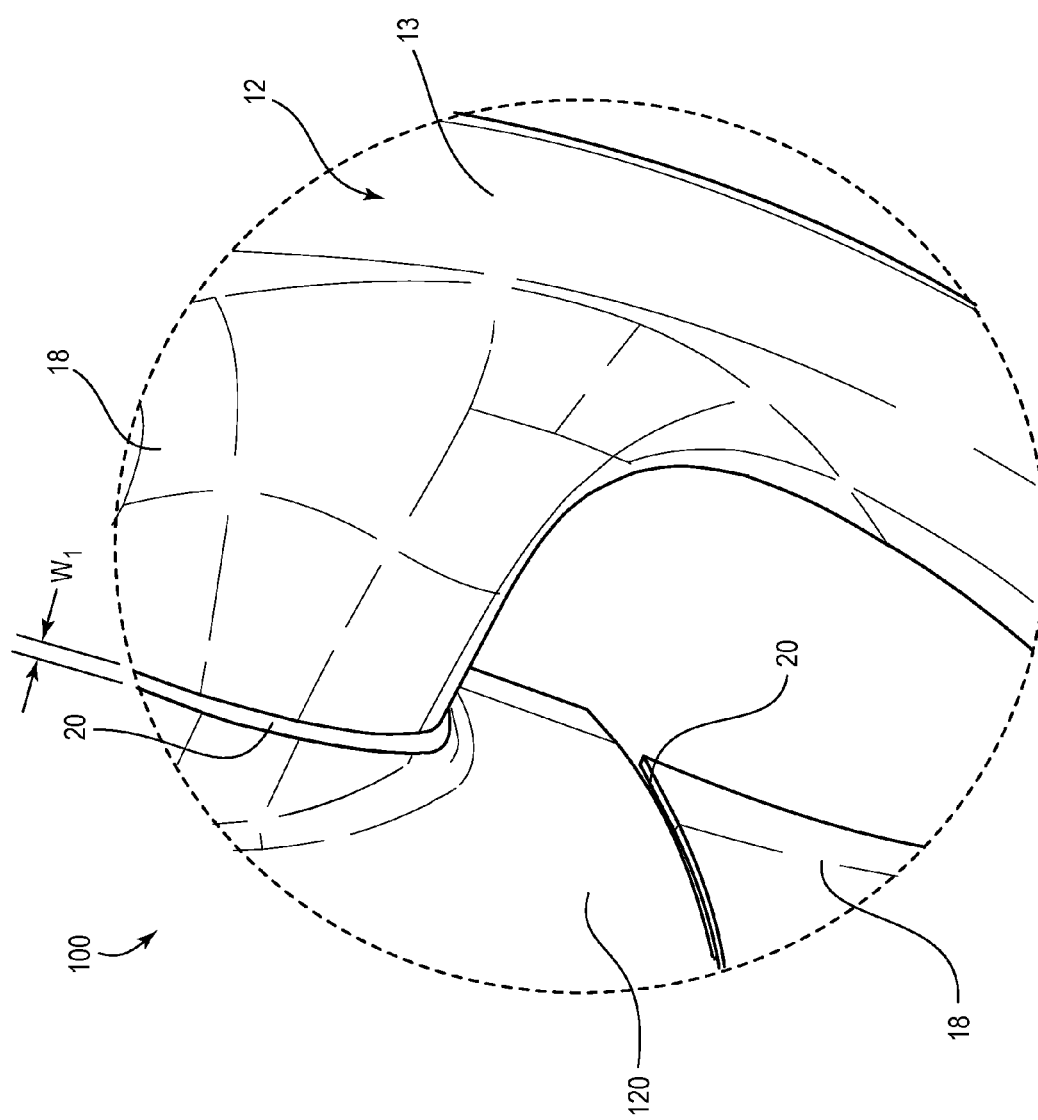
FIG. 3 is a close up front perspective view of the airbag assembly of FIG. 2.

FIG. 3 is a close-up perspective view of a portion of inflatable airbag assembly 100 and steering wheel 12. Steering wheel rim 13 and hand grips 18 may be configured such that the hand grips appear to be seamless extensions of the steering wheel rim. Gaps 20 are formed between cover 120 and hand grips 18. Inflatable airbag assembly 100 is configured such that a width $W_1$ of gap 20 is maintained consistently along a length of the gap. In other words, assembly 100 is configured to minimize deviations of width $W_1$. Gap 20 may comprise a width $W_1$ within in a range of about 0.5 mm to about 3.0 mm. Width $W_1$ may vary along its length within a range from about 0.2 mm to about 1.5 mm.

Figure 4:
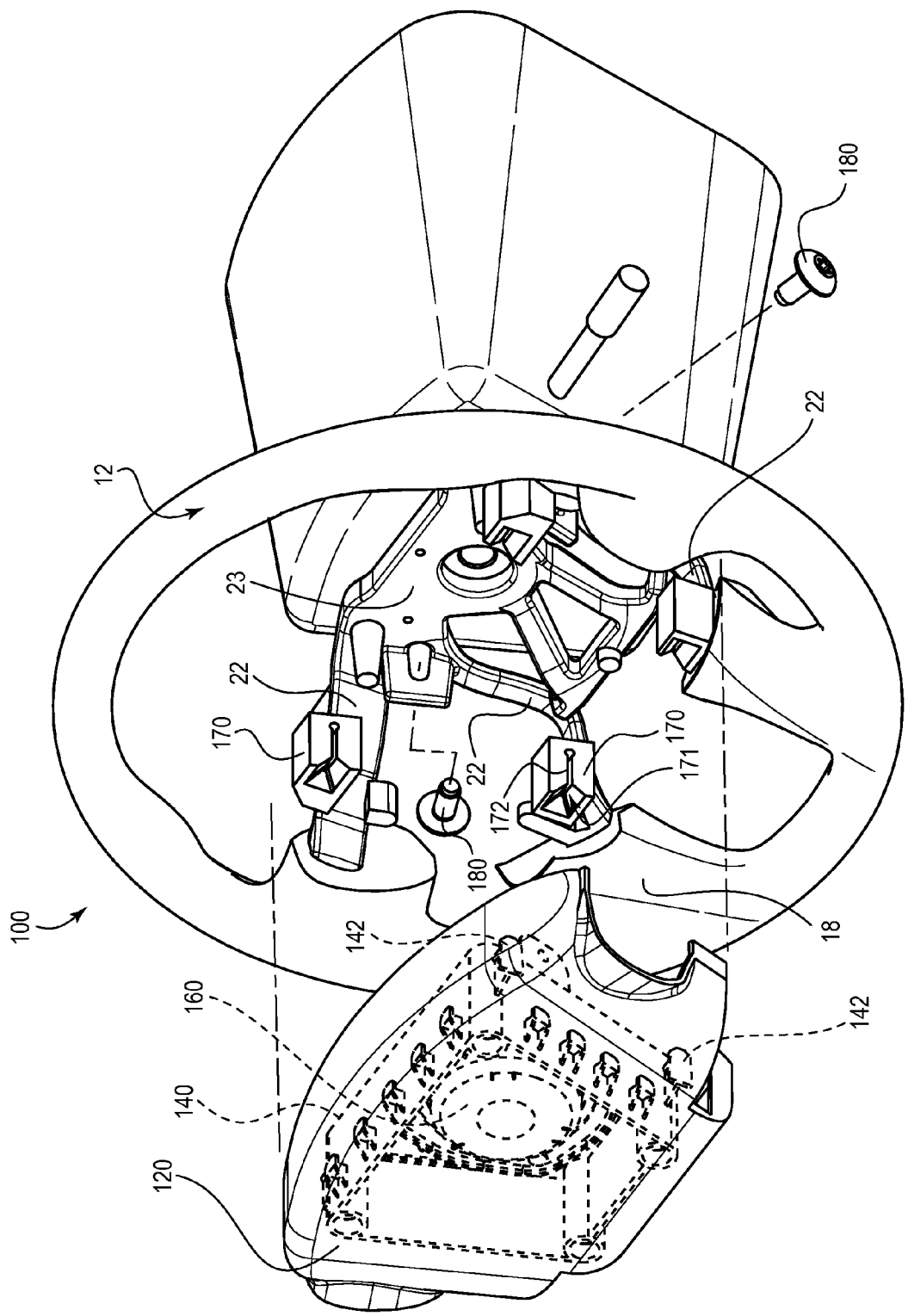
FIG. 4 is a partially exploded perspective view of the airbag assembly of FIG. 2.

FIG. 4 is a partially exploded perspective view of assembly 100, wherein cover 120, airbag housing 140, and inflator 160 are coupled together, but are removed from steering wheel 12. Airbag housing 140 comprises a fin 142 that is configured to be received by a nest 170 that is coupled to armature 22. Armature 22 may comprise a metal spoke that extends from a central region 23 of the steering wheel. Nest 170 may comprise a plastic piece that has a first side 171 and a slot 172 that opens on the first side such that the slot can receive fin 142 of housing 140. Mounting hardware 180 is configured to extend through mounting apertures in the housing mounting bracket.

In the depiction of figures herein, nest 170 appears to not be coupled to steering wheel 12; however, nest 170 may comprise an extension of steering wheel 12, such as an extension of hand grip 18. In other embodiments, the nests may not comprise extensions of the steering wheel, but rather may be independently molded or coupled to the armature. The nests may comprise polyurethane, or in other embodiments, hard injection molded plastic.

Figure 5:
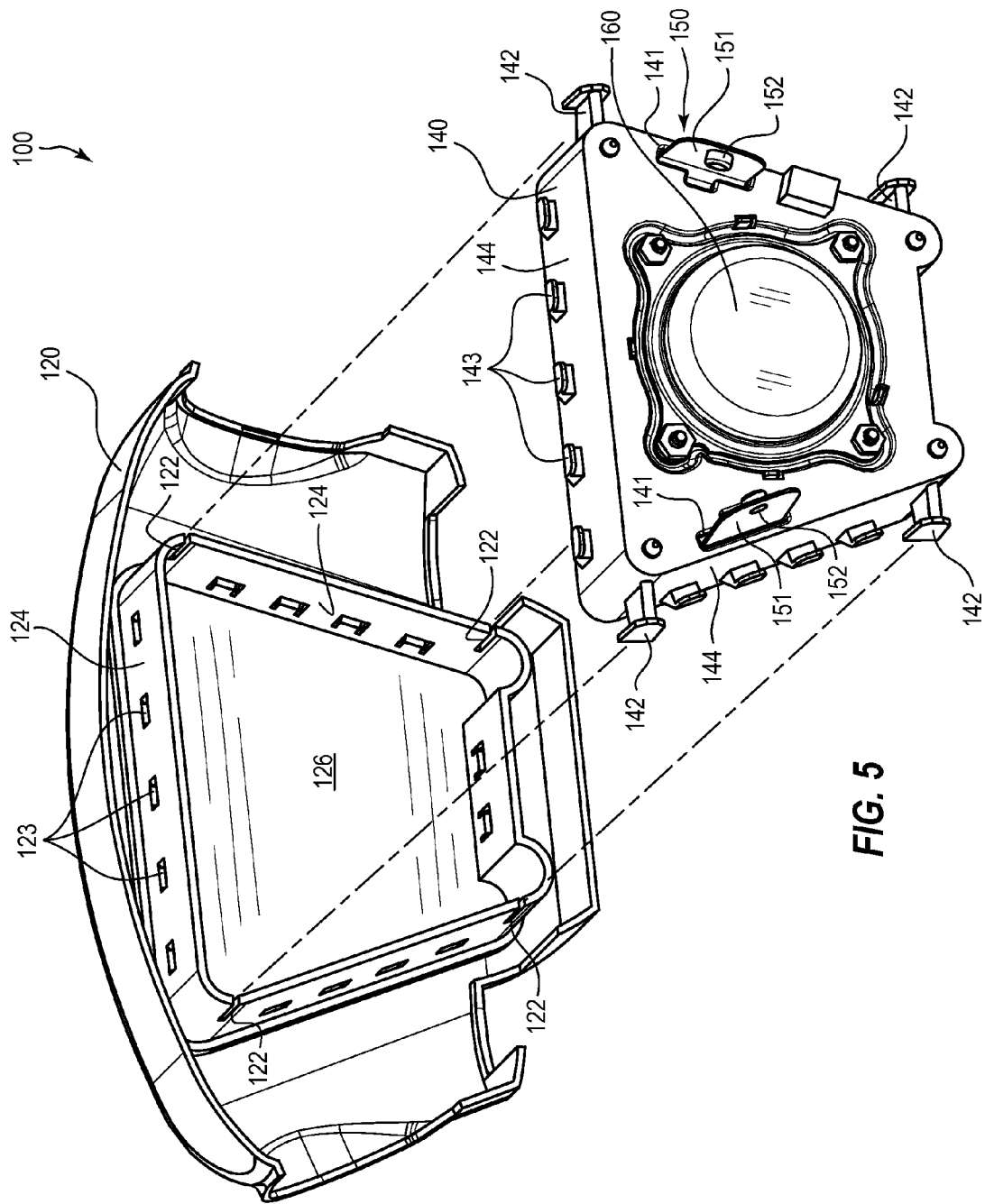
FIG. 5 is a rear perspective view of an airbag cover and airbag housing, which comprise portions of the airbag assembly of FIG. 1A.

FIG. 5 is a rear perspective view, wherein a portion of airbag assembly 100 is exploded. Inflator 160 and airbag housing 140 are coupled together, but have been removed from cover 120. Cover 120 has an inside face, from which a plurality of sidewalls 124 extend. Sidewalls 124 may comprise a plurality of structures for coupling cover 120 to airbag housing 140. In the depicted embodiment, the mounting structures comprise apertures 123, which are configured to receive hooks 143 on housing 140, thereby retaining the cover on the housing. Sidewalls 124 may also comprise slots 122, which are configured to receive fins 142. Fins 142 may comprise "T" shapes, or any other suitable shape. One skilled in the art will recognize that a variety of types and configurations of fins and nests can be employed without departing from the spirit of the present invention. For example, fins and nests may be generically called "coupling" structures. Further, the fins and nests may be comprise any suitable shape. Also, the location of the fins and nests may be reversed such that the fins are located on the steering wheel and the nests are located on the housing. Further, the fins or nests may be located on the cover, rather than on the housing.

Airbag housing 140 comprises sidewalls 144, which may comprise structures for coupling cover 120 to the housing. Housing 140 may comprise a metal or polymer. In the depicted embodiment, housing 140 comprises hooks 143, which are configured to be received by apertures 123. As such, cover 120 sidewalls 123 comprise a slightly longer perimeter than housing 140 sidewalls 144, so that the cover sidewalls fit over the housing sidewalls, thereby allowing the cover to "snap" into place on the housing. Housing 140 may further comprise apertures 141, through which arms 151 of housing mounting bracket 150 can protrude. Arms 151 comprise mounting apertures 152 that are configured to receive a mounting structure, such as a bolt. Arms 151 are flexible, such that airbag housing 150 can move in one axis, even when the housing is attached to the steering wheel armature via the bolt.

Figure 6:
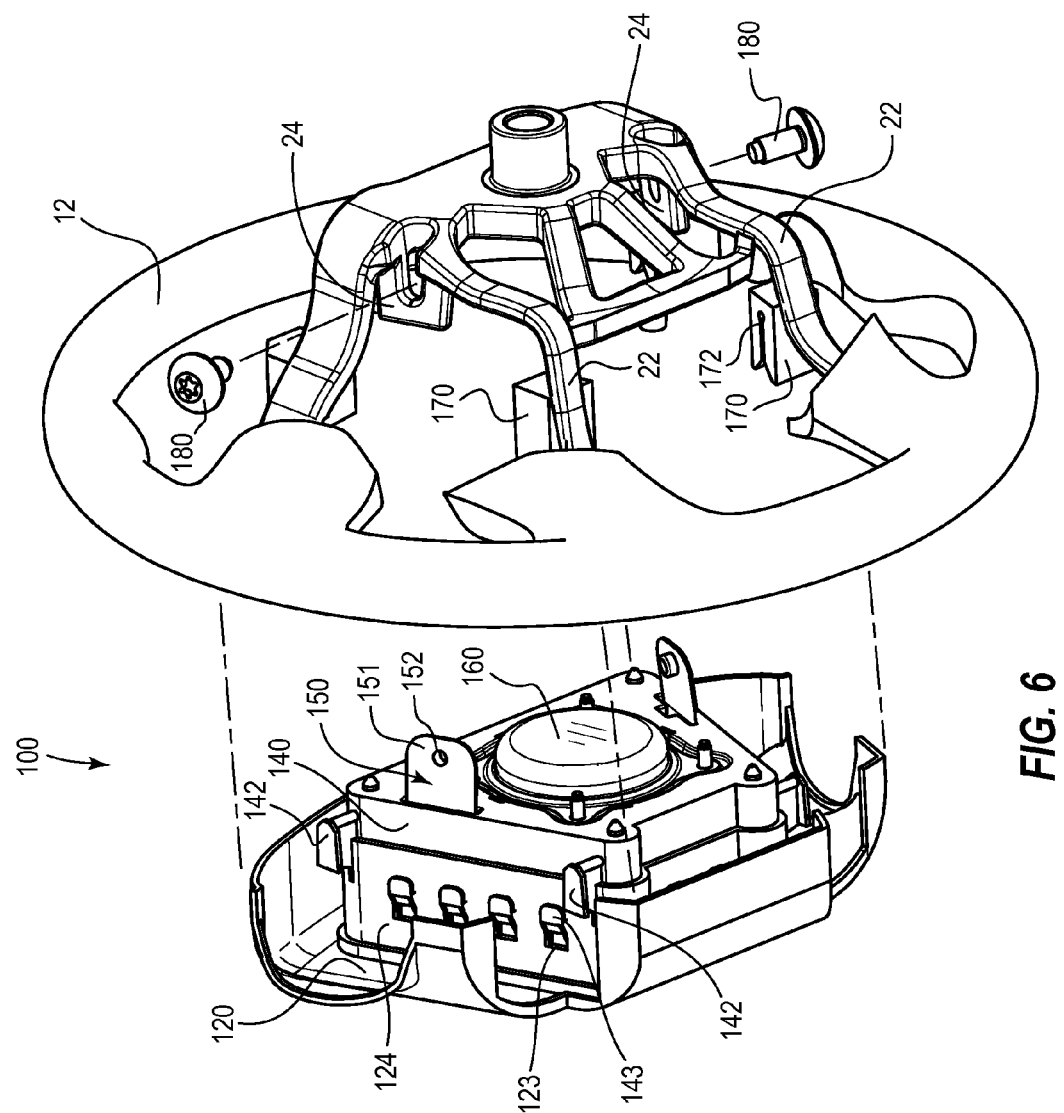
FIG. 6 is a perspective view of the airbag assembly of FIG. 1A, wherein the airbag assembly is detached from the steering wheel.

FIG. 6 is a rear perspective view of airbag assembly 100 and steering wheel 12, wherein the assembly is coupled together, but not yet attached to the steering wheel. Cover 120 and housing 140 are depicted as being coupled together via coupling structures 123 and 143, such that cover sidewalls 124 overlap the housing. Slots in cover sidewalls 124 have been received by fins 142, which are aligned with slots 172 of nests 170. Nests 170 may be coupled to armature 22, or may act as spacers that are not attached to the armature. Arms 151 of housing mounting bracket 150 protrude through apertures in housing 140, and are configured to rest adjacent steering wheel armature mounting structures 24, such that apertures 152 align with apertures in mounting structures 24. Bolts 180 are configured to protrude through mounting structures 24 and apertures 152 such that airbag assembly 100 is attached to steering wheel 12.

Figure 7:
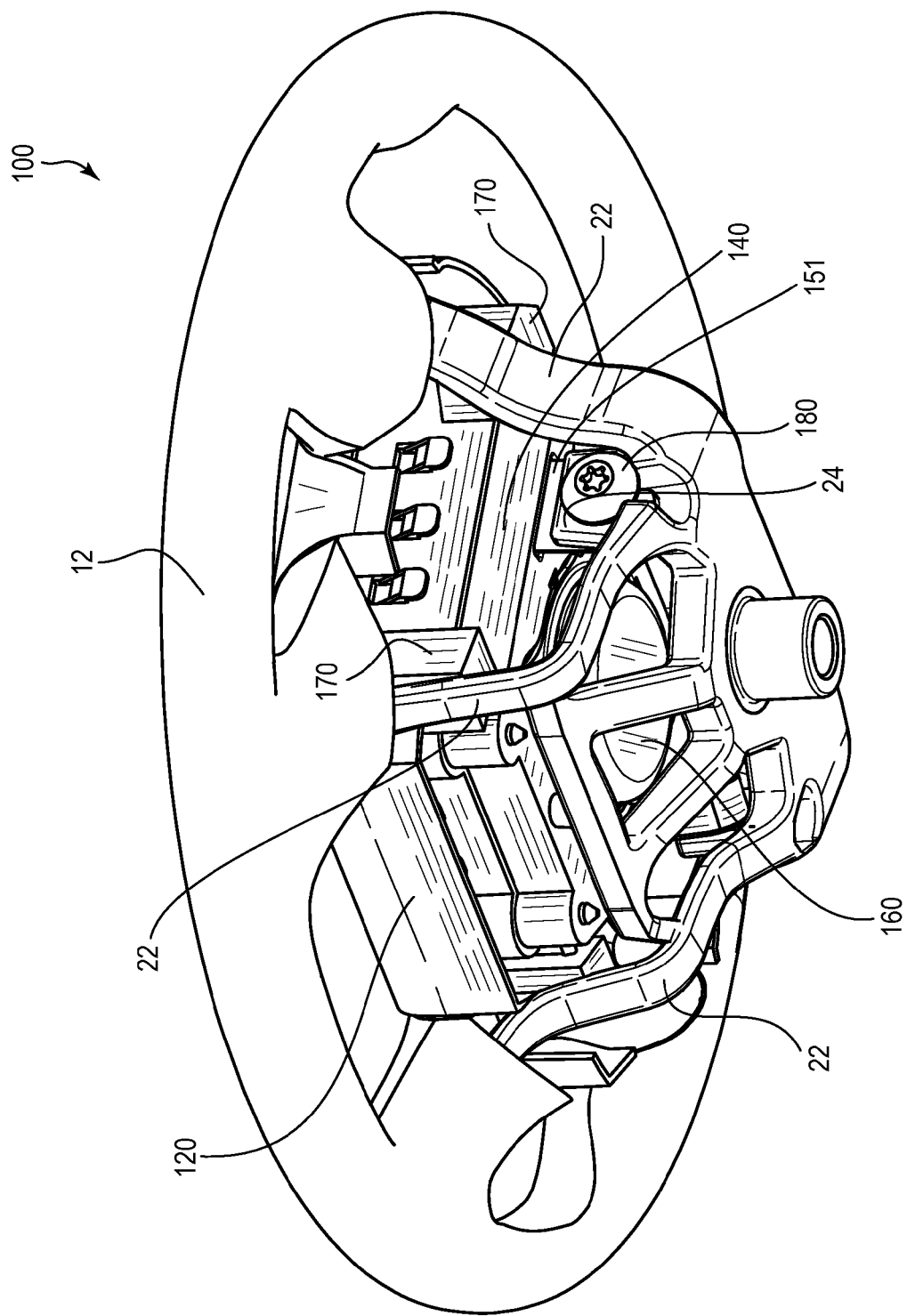
FIG. 7 is a perspective view of the airbag assembly of FIG. 6, after the airbag assembly has been attached to the steering wheel.

FIG. 7 is a bottom perspective view of airbag assembly 100 and steering wheel 12 after the steering wheel and the airbag assembly have been coupled together. Cover 120 and inflator 160 are coupled to airbag housing 140. The inflatable airbag is in a packaged configuration within airbag housing 140. Airbag housing mounting bracket arm 151 protrudes through a bottom wall of housing 140, and is attached to armature 22 of steering wheel 12 at mounting structure 24 via bolt 180. Housing 140 and cover 120 comprise a predetermined shape, such that airbag assembly 100 fits within armature 22 in a predetermined orientation. Nests 170 may be employed to position assembly 100 in the predetermined orientation.

Figure 8:
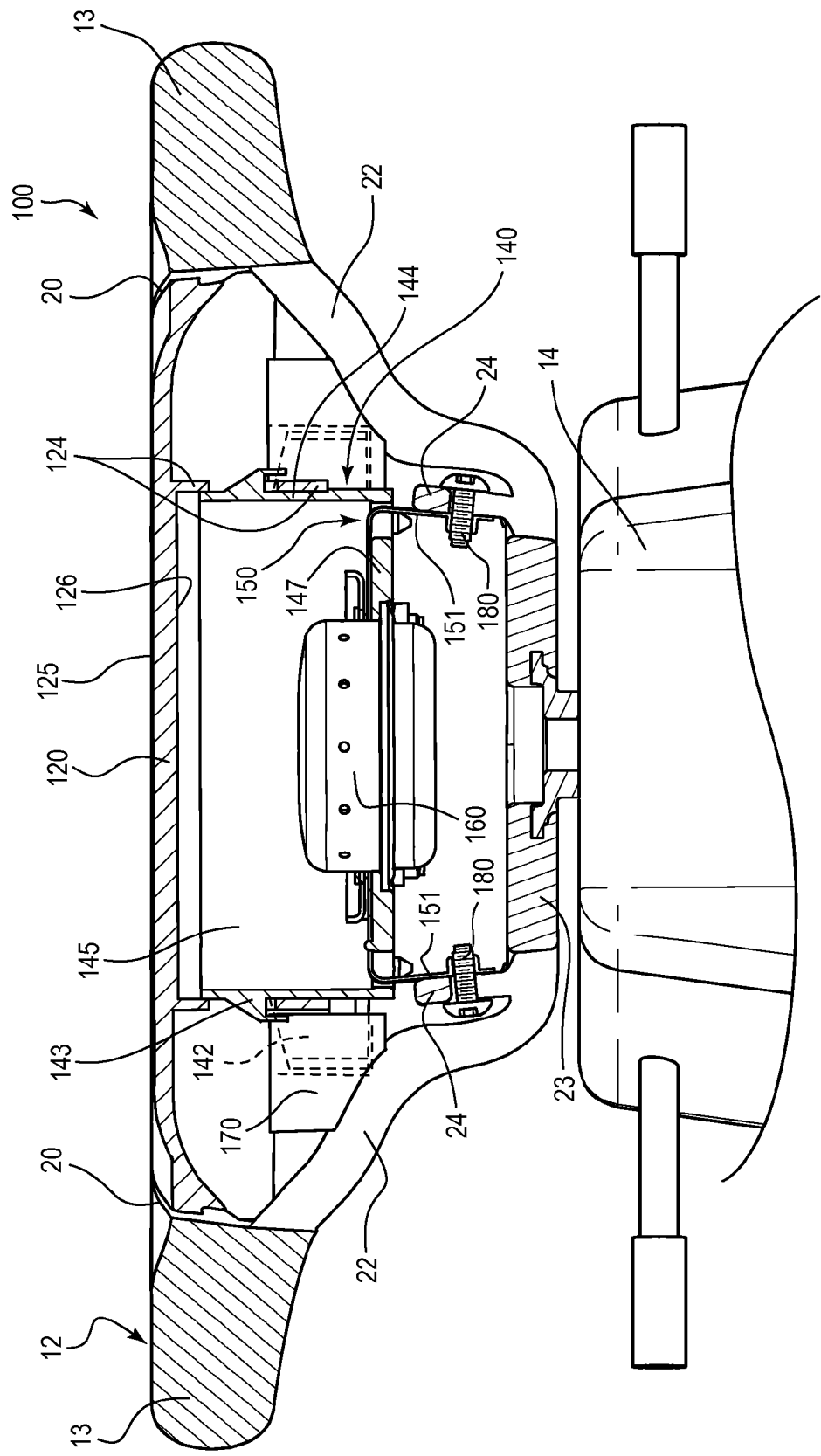
FIG. 8 is a cross-sectional view of the airbag assembly and steering wheel of FIG. 7.

FIG. 8 is a cross-sectional illustration of airbag assembly 100, wherein the airbag assembly is mounted in steering wheel 12, which is attached to steering wheel column 14. Cover 120 comprises an outside face 125 and an inside face 126. Sidewalls 124 of cover 120 extend from inside face 126 and are configured to fit around and overlap inflatable airbag sidewalls 144 of housing 140. Sidewalls 144 and bottom wall 147 of housing 140 form a cavity 145 into which the inflatable airbag can be folded. Cover 120 defines a top wall of cavity 145. Sidewalls 144 also comprise hooks 143, which are received by apertures in sidewalls 124 of cover 120. Sidewalls 144 further comprise fins 142, which are configured to be received by nests 170. Nests 170 may be coupled to steering wheel armature 22, or may act as spacers between housing 140 and the steering wheel armature.

In the assembled or packaged configuration, depicted in FIG. 8, bracket 150 can flex laterally (depicted as horizontally in FIG. 8). As such, mounting bracket 150 does not determine the lateral position of housing 140 and cover 120, relative to steering wheel 12. Rather, fins 142 and nests 170 determine the lateral positioning of cover 120 and housing 140. Therefore, a width and variance of the width of gap 20 is not determined by armature 22 of steering wheel 12 and mounting bracket 150. In other words, the armature has been removed from the cover stack-up. In the assembled configuration, fins 142 and nests 170 locate the position of cover 120 and housing 140 in three dimensions.

Housing mounting bracket 150 comprises arms 151, which protrude through apertures in bottom wall 147 of housing 140. Arms 151 are employed to attach airbag assembly 100 to steering wheel 12 via bolts 180. Bolts 180 extend through mounting structures 24 and arms 151. Steering wheel rim 13, armature 24 and central portion 23 define a concavity in steering wheel 12, into which airbag assembly 100 is configured to fit. Gap 20 is formed between cover 120 and steering wheel 12. Housing mounting bracket 150 may comprise a flexible member, which combined with nests 170, allow airbag assembly 100 to be positioned within steering wheel 12 such that gap 20 has a consistent width.

Figure 9:
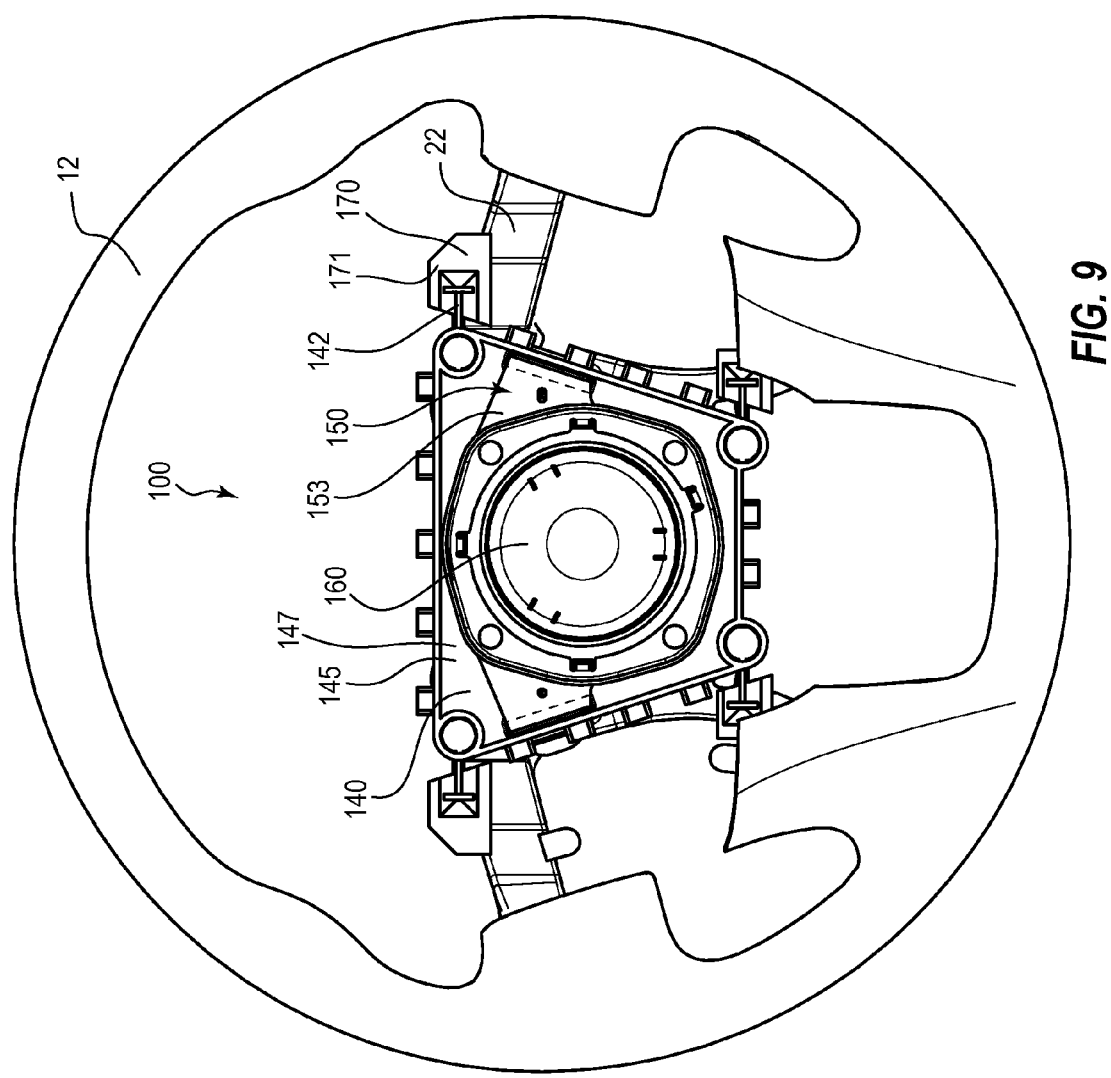
FIG. 9 is a top view of a portion of the airbag assembly of FIG. 1A, wherein the airbag housing is coupled to the steering wheel.

FIG. 9 depicts a portion of inflatable airbag assembly 100, wherein the cover and the inflatable airbag have been removed from airbag housing 140. Inflatable airbag housing 140 is coupled to steering wheel 12 armature 22. Inflator 160 and housing mounting bracket 150 are coupled to housing 140 bottom wall 147. Fins 142 have been received by slots that are contiguous with first side 171 of nests 170. Housing mounting bracket 150 comprises a body portion 153 that receives inflator 160.

Figure 10:
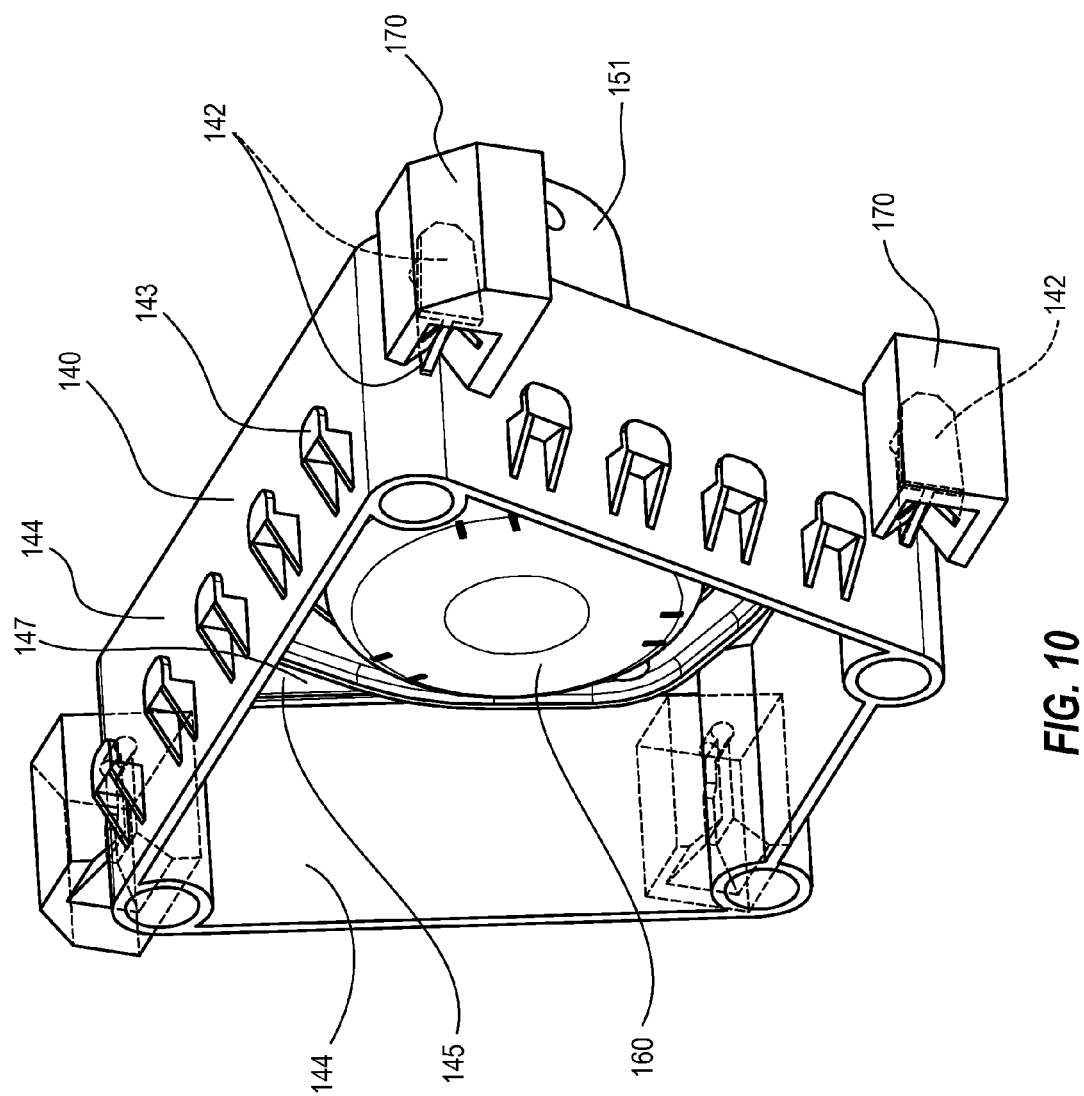
FIG. 10 is a perspective view of the airbag housing of FIG. 9, wherein the housing is detached from the steering wheel.

FIG. 10 is a side perspective view of housing 140, wherein inflator 160 is coupled to the airbag housing at a bottom wall 147. Bottom wall 147 and side walls 144 partially define a cavity 145 into which the inflatable airbag can be rolled and/or folded. Sidewalls 144 have fins 142 and hooks 143. As described herein, fins 142 are configured to be received by nests 170. Nests 170 may also be described as being spacers, wherein the nests are not attached to, or coupled to, the steering wheel.

Figure 11:
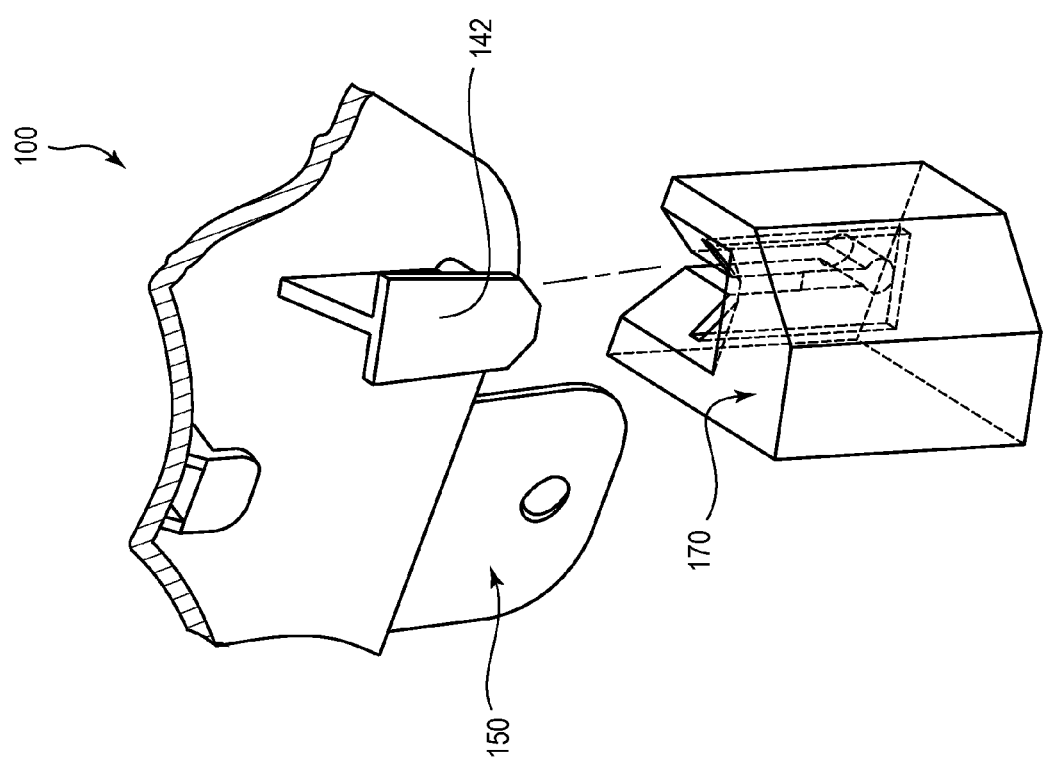
FIG. 11 is a close up perspective view of a portion of the airbag housing of FIG. 10.

FIG. 11 is a close up, cutaway perspective view of a portion of airbag assembly 100, wherein portions of housing 140 and mounting bracket 150 are depicted. Fin 142 of housing 140 may comprise a "T" shape that is configured to be received by a complementary slot in nest 170. However, one skilled in the art will recognize that a variety of configurations and types of fins may be employed without departing from the sprit of the present disclosure.

Figure 12:
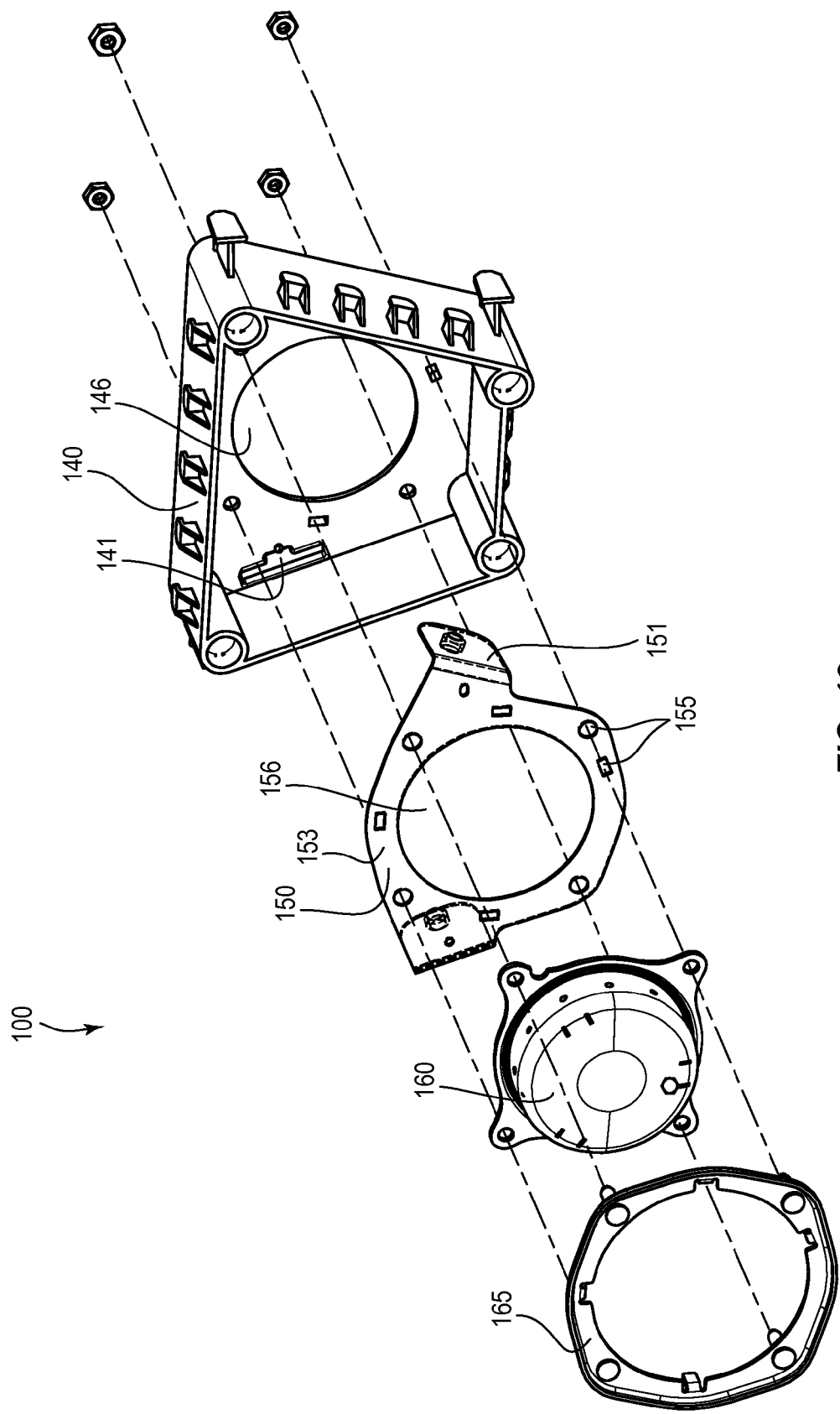
FIG. 12 is an exploded perspective view of a portion of the inflatable airbag assembly of FIG. 1A.

FIG. 12 is an exploded perspective view of a portion of airbag assembly 100, wherein housing 140, housing mounting bracket 150, inflator 160, and inflator mounting bracket 165 are depicted. Inflator 160 may be coupled to housing 140 via an inflator mounting bracket 165 that has a plurality of mounting stems that are configured to protrude through apertures in the inflator, housing mounting bracket, and the housing. The inflator mounting bracket 165 mounting stems may then be secured with nuts, such that inflator mounting bracket 165, inflator 160, housing mounting bracket 150, and housing 140 are fixedly coupled. Inflator 160 may comprise a disk style inflator that generates and/or releases inflation gas in response to activation via electronic signaling from one or more vehicle sensors. Inflator mounting bracket 165 may comprise a stamped metal piece.

Housing mounting bracket 150 comprises a body 153 that has an aperture 156, defined by a perimeter formed by the body of the mounting bracket. Aperture 156 is configured to receive a portion of inflator 160. Arms 151 of housing mounting bracket 150 may comprise contiguous extensions of the mounting bracket, or in an alternative embodiment, the arms may comprise a separate piece that is attached to body 153 of the bracket. Housing 140 may comprise an aperture 141 on bottom wall 147, through which arm 151 of mounting bracket 150 can protrude. Bottom wall 147 of housing 140 also comprises an aperture 146, through which a portion of the inflator may protrude.

Figure 13:
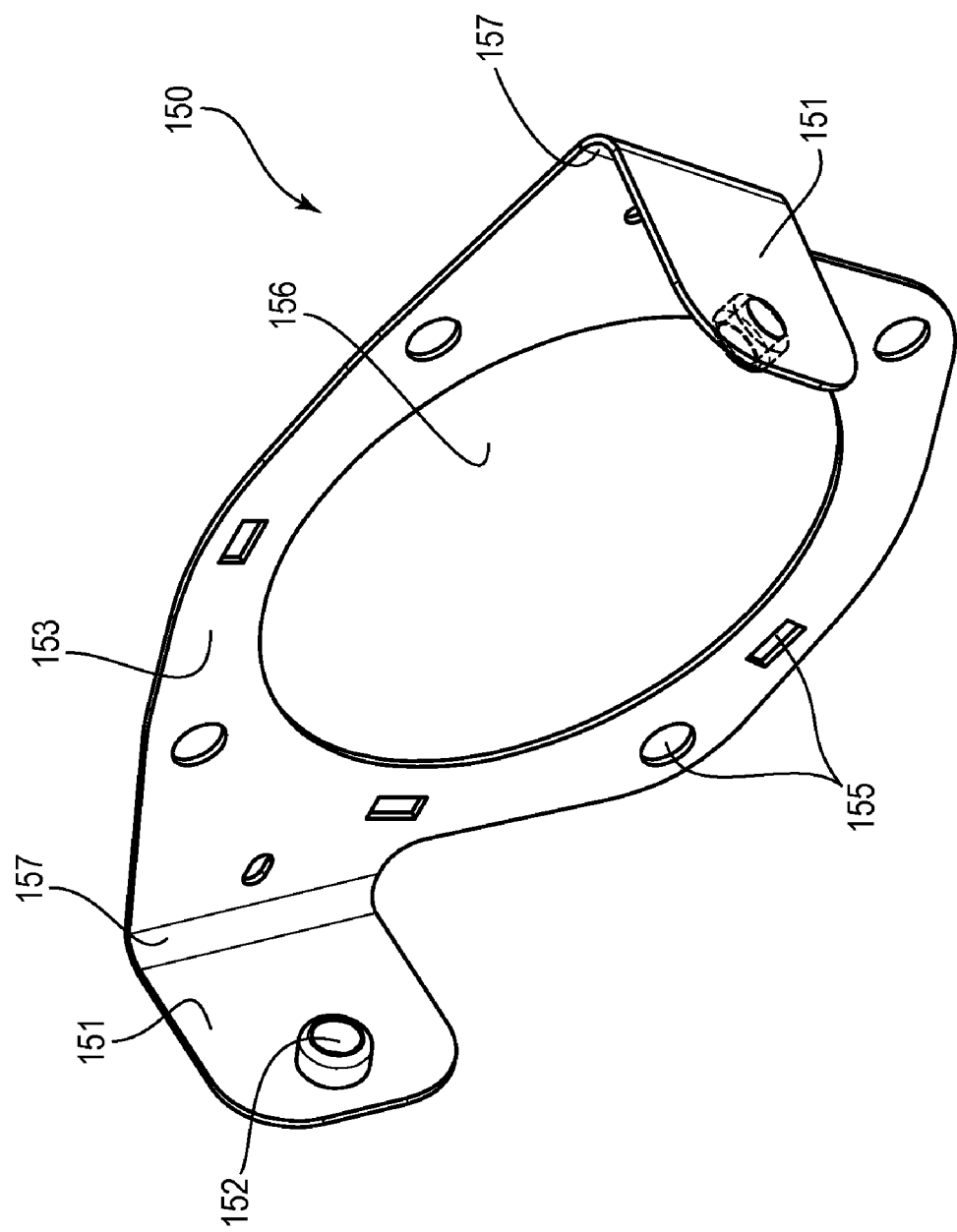
FIG. 13 is a perspective view of an inflatable airbag housing mounting bracket, which is a component of the airbag assembly of FIG. 1A.

FIG. 13 depicts a perspective view of inflatable airbag housing mounting bracket 150. Mounting bracket 150 may comprise arms 151 with apertures 152, wherein the arms extend from a body 153 that comprises a plurality of apertures, including inflator aperture 156 and mounting apertures 155. Mounting bracket 150 may comprise a flexible portion 157 that is configured to flex such that the airbag housing can be located in a predetermined position with the steering wheel. Mounting bracket 150 may not comprise a discrete flexible portion, but rather arm 151 and a junction 157 of the arm and body portion 153 may comprise a flexible material. Mounting bracket 150 may comprise a metal, such as steel. Junction 157 does not imply that two different materials are used to form bracket 150; rather, junction 157 may comprise a bend of a contiguous material. Bracket 150 is configured to flex laterally at bend 157.

Figure 14:
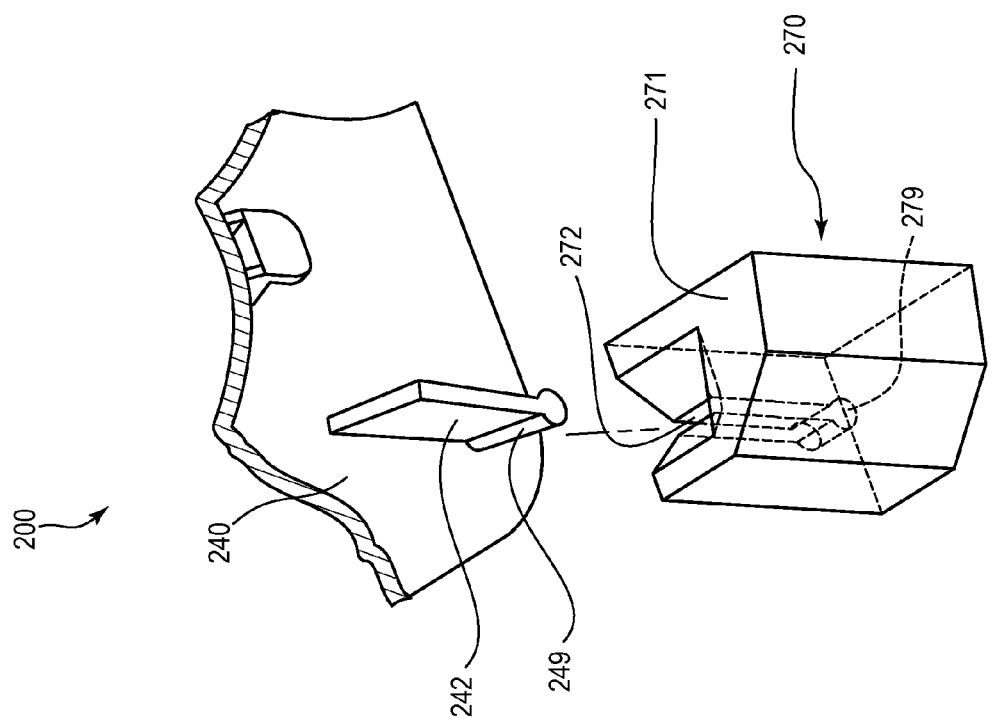
FIG. 14 is a close up perspective view of another embodiment of an inflatable airbag housing.

FIG. 14 depicts a close up perspective view of another embodiment of an airbag assembly 200 with an airbag housing 240, wherein the airbag assembly 200 and the airbag housing 240 resemble airbag assembly 100 and airbag housing 140, described above, in certain respects. Accordingly, like features may be designated with like reference numerals, with the leading hundreds numeral incremented from "1" to "2". Any suitable combination of the features described with respect to airbag assembly 100 and airbag housing 140 can be employed with assembly 200 and airbag housing 240, and vice versa.

Inflatable airbag housing 240 comprises a fin 242 that has a snap feature 249. Fin 242 is configured to be received by nest 270. Nest 270 has a first side 271 that opens into a slot 272 that has a snap feature 279 that is complementary to snap feature 249 on fin 242.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly for use in a vehicle steering wheel having a rim, wherein the steering wheel has a plurality of nests, the assembly comprising:
- an inflatable airbag housing configured to house an inflatable airbag in fluid communication with an inflator, wherein the housing comprises a plurality of fins that extend away from the housing and are each configured to be received by one of the nests in the steering wheel;
- a cosmetic cover disposed over the airbag housing; and,
- a flexible mounting bracket coupled to the airbag housing, wherein the mounting bracket is configured to be attached to an armature of the steering wheel,
- wherein when the fins are received by the nests, the inflatable airbag assembly is located at a predetermined position in all three dimensions, and wherein the flexible mounting bracket flexes such that when the flexible mounting bracket is attached to the steering wheel, the flexible mounting bracket does not alter the position of the inflatable airbag assembly relative to the steering wheel rim.

2. The airbag assembly of claim 1, wherein the flexible mounting bracket is bolted to the steering wheel armature.

3. The airbag assembly of claim 2, wherein a plurality of gaps are located between the cosmetic cover and the steering wheel.

4. The airbag assembly of claim 1, wherein the flexible mounting bracket flexes laterally.

5. The airbag assembly of claim 1, wherein the cosmetic cover receives at least one of the fins on the airbag housing.

6. An inflatable airbag assembly for use in a vehicle steering wheel having a rim, wherein the steering wheel has a plurality of nests that each have a slot, the assembly comprising:
- an inflatable airbag housing configured to house an inflatable airbag in fluid communication with an inflator, wherein the housing comprises a plurality of substantially planar fins that extend away from sidewalls of the housing and are each configured to be received by one of the nests in the steering wheel;
- a cosmetic cover disposed over the airbag housing; and,
- a flexible mounting bracket coupled to the airbag housing, wherein the mounting bracket is configured to be attached to an armature of the steering wheel,
- wherein when the fins are received by the nests, the inflatable airbag assembly is located at a predetermined position in all three dimensions, and wherein the flexible mounting bracket flexes such that when the flexible mounting bracket is attached to the steering wheel, the flexible mounting bracket does not alter the position of the inflatable airbag assembly relative to the steering wheel rim.

7. The inflatable airbag assembly of claim 6, wherein the fins comprise a "T" shape, and the nests in the steering wheel comprise a complementary "T" shaped slot.

8. The inflatable airbag assembly of claim 6, wherein the fins and the slot in the nests form an interference fit.

9. The inflatable airbag assembly of claim 6, wherein the housing comprises a plurality of cosmetic cover coupling structures.

10. The inflatable airbag assembly of claim 9, wherein the cover comprises a plurality of airbag housing coupling features.

11. The inflatable airbag assembly of claim 10, wherein the cosmetic cover coupling features comprise a plurality of apertures.

12. The inflatable airbag assembly of claim 11, wherein the cosmetic cover comprises four sidewalls that project away from an inside face of the cosmetic cover and the airbag housing coupling features are located on the sidewalls of the cosmetic cover.

13. The inflatable airbag assembly of claim 6, wherein the airbag housing comprises four sidewalls, and the cosmetic cover coupling features are located on the sidewalls.

14. The inflatable airbag assembly of claim 13, wherein the cosmetic cover sidewalls overlap an outside of the airbag housing sidewalls.

15. The inflatable airbag assembly of claim 6, wherein the flexible mounting bracket comprises arms, which extend away from a bottom wall of the airbag housing.

16. The inflatable airbag assembly claim 15, wherein the arms of the flexible mounting bracket are flexed when the mounting bracket is attached to the steering wheel armature.

17. An inflatable airbag assembly for use in a vehicle steering wheel, wherein the steering wheel has a plurality of nests that have a slot, the assembly comprising:
- an inflatable airbag housing configured to house an inflatable airbag in fluid communication with an inflator, wherein the housing comprises a plurality of fins that extend away from the housing and are each configured to be received by one of the nests in the steering wheel;
- a cosmetic cover disposed over the airbag housing; and,
- a flexible mounting bracket coupled to an inside of a bottom wall of the airbag housing, wherein the mounting bracket comprises a plurality of arms that each protrude through separate apertures in the bottom wall of the airbag housing, and
- wherein the arms of the mounting bracket are configured to be bolted to an armature of the steering wheel,
- wherein when the fins are received by the nests, the inflatable airbag assembly is located at a predetermined position in all three dimensions, and wherein the flexible mounting bracket flexes such that when the flexible mounting bracket is bolted to the steering wheel, the arms of the flexible mounting bracket flex such that the position of the inflatable airbag assembly is not altered relative to the steering wheel rim.

18. The inflatable airbag assembly of claim 17 wherein when the inflator is coupled to the airbag housing and the mounting bracket, the arms of the mounting bracket are flexible and a body of the mounting bracket is not flexible.

19. The inflatable airbag assembly of claim 17, wherein each of the arms further comprise an aperture for receiving a bolt.

20. An inflatable airbag assembly, comprising:
- a steering wheel, comprising a rim connected to a central region via an armature, wherein the armature comprises a plurality of spokes, and wherein the armature comprises a nest;
- an inflatable airbag housing coupled to the steering wheel, wherein the airbag housing is configured to house an inflatable airbag in fluid communication with an inflator, and wherein the housing comprises a plurality of fins that extend away from the housing and are each configured to be received by one of the nests in the steering wheel armature;
- a cosmetic cover disposed over the airbag housing; and,
- a flexible mounting bracket coupled to the airbag housing, wherein the mounting bracket is configured to be attached to an armature of the steering wheel,
- wherein when the fins are received by the nests, the inflatable airbag assembly is located at a predetermined position in all three dimensions, and wherein the flexible mounting bracket flexes such that when the flexible mounting bracket is attached to the steering wheel, the flexible mounting bracket does not alter the position of the inflatable airbag assembly relative to the steering wheel rim.

21. The airbag assembly of claim 20, wherein the flexible mounting bracket is bolted to the steering wheel armature.

22. The airbag assembly of claim 20, wherein a plurality of gaps are located between the cosmetic cover and the steering wheel.

23. The airbag assembly of claim 20, wherein the flexible mounting bracket flexes laterally.

24. The airbag assembly of claim 20, wherein the cosmetic cover receives at least one of the fins on the airbag housing.

25. The inflatable airbag assembly of claim 20, wherein the flexible mounting bracket comprises arms, which extend away from a bottom wall of the airbag housing.

26. The inflatable airbag assembly claim 25, wherein the arms of the flexible mounting bracket are flexed when the mounting bracket is attached to the steering wheel armature.

* * * * *